US00RE42995E

(19) United States
(12) Reissued Patent
Joffe et al.

(10) Patent Number: US RE42,995 E
(45) Date of Reissued Patent: Dec. 6, 2011

(54) NETWORK DISTRIBUTED FAX DEVICE

(75) Inventors: Neil Raymond Joffe, Los Altos, CA (US); Ilya Umansky, Sam Jose, CA (US)

(73) Assignee: Cisco Technology, Inc., San Jose, CA (US)

(21) Appl. No.: 11/197,723

(22) Filed: Aug. 3, 2005

Related U.S. Patent Documents

Reissue of:
(64) Patent No.: 6,801,341
Issued: Oct. 5, 2004
Appl. No.: 09/361,480
Filed: Jul. 26, 1999

(51) Int. Cl.
*G06F 3/12* (2006.01)
*H04N 1/00* (2006.01)

(52) U.S. Cl. ..... 358/407; 358/402; 358/403; 358/404; 358/405; 358/406; 358/1.15

(58) Field of Classification Search ..... 358/400, 358/403, 405, 407, 426.11, 426.12, 435, 358/436, 438, 443, 1.15, 402, 404, 406, 468; 379/100.01, 100.15, 102.02, 100.03, 100.06, 379/100.08, 100.12, 100.05; 455/88, 91, 455/557; 709/206
See application file for complete search history.

(56) References Cited

U.S. PATENT DOCUMENTS 4,918,722 A * 4/1990 Duehren et al. ..... 379/100.11
5,291,546 A * 3/1994 Giler et al. ..... 379/93.11
5,369,686 A * 11/1994 Dutra et al. ..... 379/93.24
5,488,651 A * 1/1996 Giler et al. ..... 379/100.14
5,712,907 A * 1/1998 Wegner et al. ..... 379/114.02
5,767,985 A * 6/1998 Yamamoto et al. ..... 358/402
5,805,298 A * 9/1998 Ho et al. ..... 358/402
5,812,278 A * 9/1998 Toyoda et al. ..... 358/402
5,838,683 A * 11/1998 Corley et al. ..... 370/408
5,872,845 A * 2/1999 Feder ..... 358/442
6,134,598 A * 10/2000 Raman ..... 709/246
6,182,111 B1 * 1/2001 Inohara et al. ..... 709/201
6,483,600 B1 * 11/2002 Schuster et al. ..... 358/1.15
6,512,593 B1 * 1/2003 Yashiki ..... 358/1.15
6,810,409 B1 * 10/2004 Fry et al. ..... 709/202
7,293,099 B1 * 11/2007 Kalajan ..... 709/230

FOREIGN PATENT DOCUMENTS

WO WO97/18665 * 5/1997

* cited by examiner

*Primary Examiner* — Jerome Grant, II
(74) *Attorney, Agent, or Firm* — Stolowitz Ford Cowger LLP

(57) ABSTRACT

An embodiment of the present invention includes a fax communication system for communicating fax information transmitted from a sending fax device to a fax recipient through a packet switching network. The sending fax device includes a data pump for modulating and demodulating fax information and a protocol subsystem for encoding and decoding the modulated fax information. The fax sending fax device modulates the fax information prior to transmission thereof. At least one access server is coupled between the sending fax device and the fax recipient and within the packet switching network At least one of the access servers receives modulated fax information from the sending fax device and demodulates the received fax information. The fax relay server is responsive to the demodulated fax information and operative to decode the received demodulated fax information for transmission thereof to the fax recipient, wherein the at least one access server and fax relay server function as a network distributed fax device allowing for expansion of fax functionality throughout the network while preserving the reliability and robustness of the network.

22 Claims, 5 Drawing Sheets

NETWORK DISTRIBUTED FAX DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to communications systems using fax devices for transmission of fax information through packet switching networks and particularly to transmission of fax information wherein modulation/demodulation of fax information occurs independently of and remotely from the protocol implementation used prior to transmission of information.

2. Description of the Prior Art

Facsimile (Fax) machines are commonly employed in modern communications systems. Typically, two fax machines are in communication with each other exchanging messages faxed by users thereof. The messages transmitted by a fax machine are generally in analog format and are often transmitted through a Public Switching Telephone Network (PSTN) as depicted in FIG. 1.

In FIG. 1, fax machine 12 is shown to be in communication with fax machine 14 through the PSTN 16. Transmission line 18 couples the fax machine 12 to the PSTN 16, which is in turn linked to the fax machine 14 via the communication line 20. Also shown in FIG. 1 are the various components which comprise a typical fax machine. A protocol subsystem 22 within fax machine 12 operates to implement various protocols, such as the T.30 and T.4/T.16 protocols, which are commonly used in the industry. Additionally, a data pump 24, a scanner 26 and a memory 28 are shown included in the fax machine 12.

Messages are exchanged between fax machines using protocol information either located within the hardware or implemented by execution of the software within the fax machine. One of the protocols is the protocol T.30 which carries information such as that relating to the size of the fax page, the type of compression technique being employed on the fax data and the like.

Other protocols, such as the T.4/T.6, are used for transferring information regarding fax pages and the actual content of the fax message. Information in conformance with the various protocols mentioned hereinabove is modulated prior to transmission thereof. The modulation protocols used to send fax messages are sometimes referred to as V-series modulation protocols such as V.21, V.29, V.17, V.33 and V.27ter. The various V-series modulations differ according to their speed of transmission. For instance, the T.30 protocol is transmitted using the V.21 modulation protocol which causes operation at a relatively slow speed of 300 bits/sec whereas the T.4/T.6 protocols are transmitted using faster modulation protocol, such as the V.17, V.29, V.33 and V.27ter. In FIG. 1, the part of the fax machine 12 which performs the V-series modulation and demodulation is the data pump 24. Demodulation applies to the case when fax machine is receiving rather than transmitting data. That is, information being received is demodulated to extract the original fax information.

In addition to the protocol subsystem 22 and the data pump 24, the fax machine 12 generally includes the scanner 26 and the memory 28. Scanner 26 scans pages of information that are to be faxed as the pages are passed through the fax machine and transforms them into black and white pixels.

The pixel information is then encoded and stored in the memory 28 of the fax machine.

Alternatively, a fax machine could be incorporated in a personal computer (PC). In such a case the data pump component of the fax machine is placed on a modem card and the component of the fax machine which executes the T.30 and T.4/T.6 protocols is a software program on the PC. The modem card is physically connected to the PC through a cable and for this reason cannot be placed in a location too remote from the PC such as in a network.

Yet another mode of communication between the fax machines 12 and 14, not shown in FIG. 1, is through a network such as the Internet or any other wide area network (WAN). An example of the latter is a WAN used by Cisco Systems, Inc. of San Jose, Calif. In such a mode of communication, referred to as fax relay, the originating fax machine is coupled to a first PSTN with the latter being linked to the network. The network is in turn linked to a second PSTN, which is coupled to the receiving fax machine so that the fax messages between the two fax machines are transmitted through the network. The network remains transparent to the communicating fax machines so that the fax machines communicate with each other in exactly the same way as that which is shown in FIG. 1.

Sending fax messages via fax relay can be considerably less expensive than the method of communication shown in FIG. 1 where the fax message is sent through the PSTN 16. In particular, if the two communicating fax machines are located remotely with respect to each other, i.e. in different parts of the world, sending fax messages through a PSTN requires paying expensive international toll rates whereas using fax relay requires paying local toll rates, which are obviously substantially less than international rates. For instance, the fax message could be sent through the Cisco WAN where the only expense is in sending the message from the local PSTNs to the fax machines. Presently, Cisco Systems manufactures products equipped with appropriate software to support fax relay. Examples of such products include access server (AS) models C2600, C3600, AS5300 and AS5800.

Access servers are located at the edges of the network. In fax relay, when a fax message is received by an access server, such as the AS5300 having fax relay capability, the message is demodulated and sent across the network to a receiving access server which is physically closest to the receiving fax machine. Messages transferred between access servers through the network are in packet form. Packets are unbundled by the receiving access server and subsequently remodulated into the original fax message and sent to a local PSTN using T.30 and T.4/T.6 protocols. The PSTN then sends the fax message to the receiving fax machine. Messages are sent from one point in the network to another point in the network using a [propriety] *proprietary* fax relay protocol or a standardized protocol such as the T.38 protocol.

An access server, such as the AS5300, does not decode the fax messages in the T.30 and T.4/T.6 protocols and the original fax information that is encoded in these protocols passes from one access server to another transparently. Consequently, no change in the contents of the fax messages takes place as the messages are transmitted through the network via the access servers. It is the fax machine which can implement the T.30 and T.4/T.6 protocols, using the protocol subsystem 22 of FIG. 1, and recover the actual fax message. Using the network to send fax messages is referred to as fax relay due to relaying of the faxed messages from one point of the network to another with no alteration in the contents of the faxed message while it travels through the network.

Fax relay is a one-to-one method of transmitting fax messages between two fax machines. Accordingly, there is an originating fax machine which dials the number of a receiving fax machine and sends the message through an intermediate network. However, it is desirable to send fax messages from the originating fax machine to an access server which may be located at any point in the network. Once received by the access server, the message could either be sent to a receiving fax machine or to an email recipient in the from of an email message. Alternatively, the message could simply be stored somewhere in the network for later delivery. The latter option is particularly useful when the receiving fax machine is busy in which case the fax message is still received by the network and stored somewhere therein. The fax message can then be transmitted to the receiving fax machine at a later time when the latter is no longer busy. Such a mode of transmitting fax messages has the effect of distributing the functionality of the fax machine throughout the network.

Therefore, the need arises to distribute the functionality of a fax device through a packet switching network thereby increasing system capacity and allowing for readily altering features of a fax device without the need for additional hardware.

SUMMARY OF THE INVENTION

Briefly, an embodiment of the present invention includes a fax communication system for communicating fax information transmitted from a sending fax device to a fax recipient through a packet switching network. The sending fax device includes a data pump for modulating and demodulating fax information and a protocol subsystem for encoding and decoding the modulated fax information. The fax sending fax device modulates the fax information prior to transmission thereof. At least one access server is coupled between the sending fax device and the fax recipient and within the packet switching [network] *network*. At least one of the access servers receives modulated fax information from the sending fax device and demodulates the received fax information. The fax relay server is responsive to the demodulated fax information and operative to decode the received demodulated fax information for transmission thereof to the fax recipient, wherein the at least one access server and fax relay server function as a network distributed fax device allowing for expansion of fax functionality throughout the network while preserving the reliability and robustness of the network.

The foregoing and other objects, features and advantages of the present invention will be apparent from the following detailed description of the preferred embodiments which make reference to several figures of the drawing.

IN THE DRAWING

DETAILED DESCRIPTION OF THE PRESENT INVENTION

Figure 2:
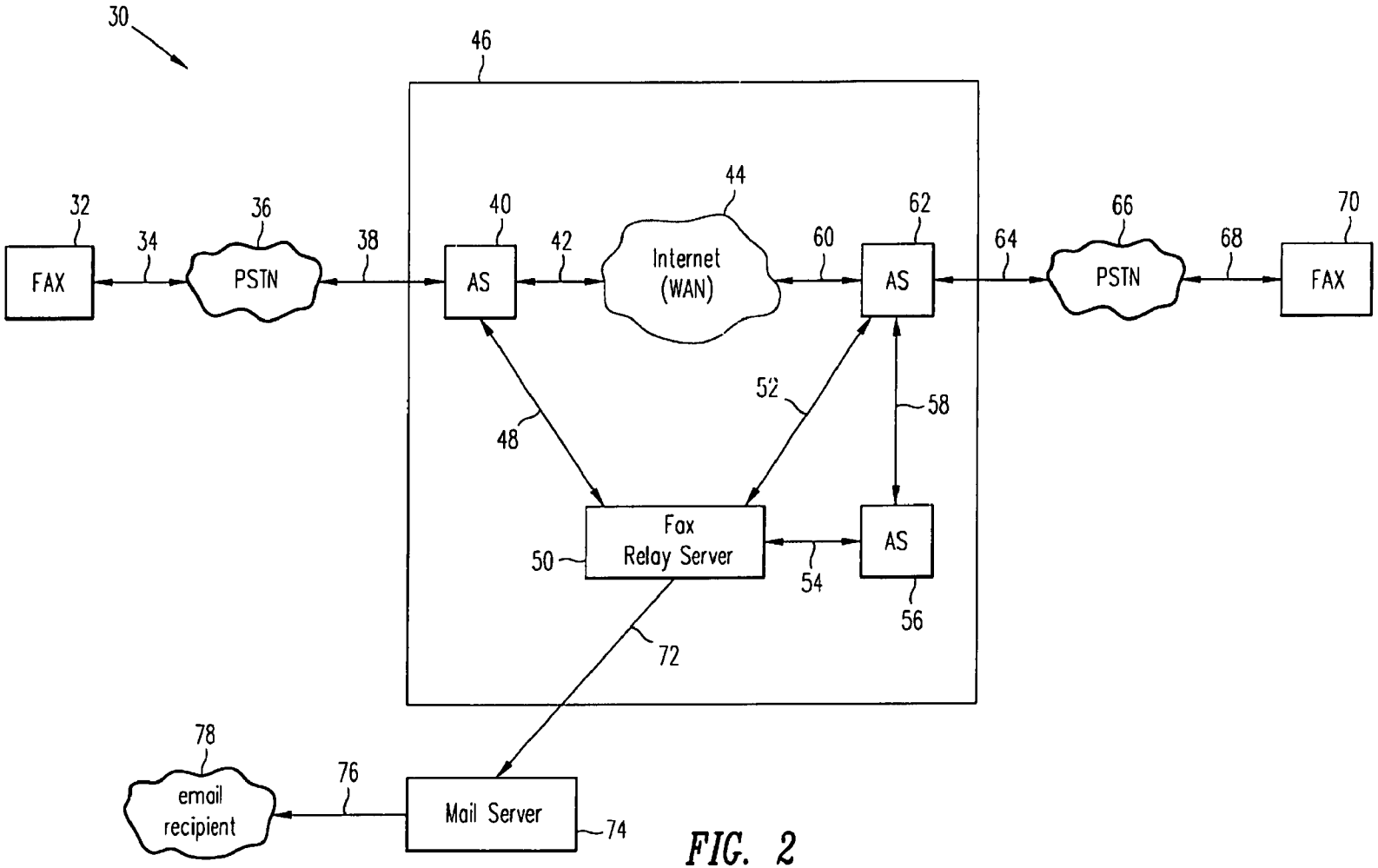
FIG. 2 shows a communications system 30 which employs fax relay and includes the fax relay server 50 in accordance with an embodiment of the present invention.

Referring now to FIG. 2, an embodiment of the present invention is shown to include a communications system 30 for establishing communication between a point of origin and a destination point. In FIG. 2, the point of origin is a fax machine 32 and the point of destination is another fax machine 70. The communications system 30 also includes two PSTNs 36 and 66, an Internet Protocol (IP) network 46, a mail server 74 and an email recipient 78.

The IP network 46 is shown to include a network 44. In one embodiment of the present invention, the [IP network 46] *network 44* is the Internet and in another embodiment, it is a WAN (such as Cisco WAN). Alternatively, other types of network may be employed without departing from the scope and spirit of the present invention. The IP network 46 is further shown to include a fax relay server 50 and a plurality of access servers (or access routers), three of which are shown in FIG. 2 as access servers 40, 56 and 62. Fax messages are transmitted by the fax machine 32 using, the T.30 protocol which contains information regarding the fax transmission such as the size of the fax paper and the type of the compression technique being performed on the fax message. The actual content of the fax message is encoded using the T.4/T.6 protocols. The fax message, in the form of T.30 and T.4/T.6 protocols, is carried through the transmission line 34 to the PSTN 36 and from there, it is transmitted to the access server 40 through the communication line 38. The fax message is transmitted by the access server 40, through the network 44, to the access server 62. The access server 62 transmits the T.30 and T.4/T.6 protocols to the PSTN 66 through the transmission line 64. The PSTN 66 then directs the protocols to the receiving fax machine 70 through the communication line 68. The path of communication can be reversed as indicated by the bi-directional arrows 34, 38, 64 and 68 in such a way that the fax message can originate at the fax machine 70 and be received by the fax machine 32.

Inside the IP network 46, information is sent from one point to another using any fax relay protocol which is the international standard for fax relay protocol. Accordingly, fax relay protocol is sent from the access server 40 to the network 44 through transmission line 42 and from the network 44 to the access server 62 through transmission line 60. Access servers 62 and 56 are coupled to each other via the communication line 58 and access servers 40, 56 and 62 are linked to the fax relay server 50 through the transmission lines 48, 54 and 52, respectively. Transmission line 72 couples the fax relay server 50 to a mail server 74, which is in communication with the email recipient 78 through a communication line 76.

Figure 1:
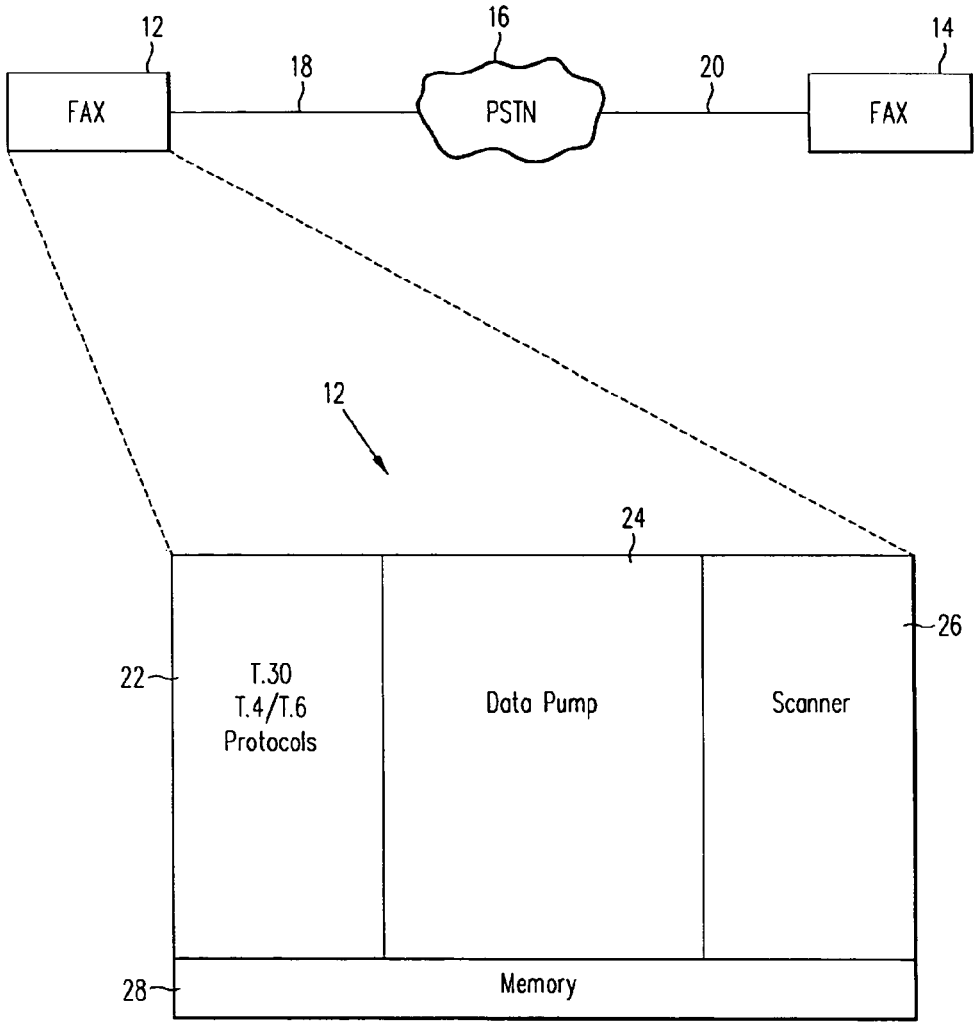
FIG. 1 (Prior Art)
FIG. 1 illustrates a prior art system in which two fax machines are in communication through the PSTN 16.

Fax machines 32 and 70, shown in FIG. 2, typically include the components shown included within the fax machine 12 in FIG. 1. The protocol subsystem 22 (shown in FIG. 1), which is also included in the fax machines 32 and 70 of FIG. 2, implements the T.30 and T.4/T.6 protocols and is located either in the hardware or executed by the software of the fax machine. A data pump 24 implements the V-series modulations such as V.21, V.29, V.17, V.33 and V.27ter.

The V-series modulations are modulation protocols of varying speeds which are used in sending fax information pursuant to the T.30 and T.4/T.6 protocols. For example, the V.21 protocol, which causes a relatively slower speed of transmission, i.e. 300 bits/sec, is used to send the T.30 protocol. The other modulation protocols such as V.29, V.17 and V.33 operate to cause faster speeds of transmission and are used to send the actual content of the fax massage as encoded in the T.4/T.6 protocols.

In the communication network 30 of FIG. 2, fax messages originate at the fax machine 32 and are relayed through the PSTN 36, the IP network 46 and the PSTN 66 to the receiving fax machine 70. For this reason, communications network 30 is also referred to as fax relay.

In traditional fax relay, fax messages in the form of T.30 and T.4/T.6 protocols, originating from the fax machine 32, pass through the PSTN 36 and reach the access server 40. The access server 40 demodulates fax messages and transmits the same across the network 44 in the form of packets. Inside of the access server 62, the packets are unbundled and re-modulated and then re-transmitted through the PSTN 66 to the receiving fax machine 70.

The access servers in the IP network have the capability of modulating and demodulating fax messages in the same way as that performed by the data pump of a typical fax machine performing modulation and demodulation functions. For this reason, access servers in the IP network 46 are sometimes referred to as data pumps. However, an access server cannot decode the messages in the T.30 and T.4/T.6 protocols and the information in such protocols passes through an access server transparently. It is in a component of a fax machine, such as the protocol subsystem 22 in FIG. 1, where the information in the T.30 and T.4/T.6 protocols are decoded and the actual fax message is recovered. Hence, in traditional fax relay, the fax message is simply relayed from one point of an IP network to another without any alteration in its content.

Information in the form of packets is transmitted from one point of the IP network 46 to another point using any proprietary fax relay protocol such as the T.38 protocol. For instance, the access server 62 communicates with the access server 56, the fax relay server 50 and the network 44 by sending and receiving fax relay protocols through the transmission lines 58, 52 and 60, respectively. The access servers are generally located at the edges of the IP network 46 and are alternatively referred to either as fax relay end points or data pumps. It is recalled that the reason for calling an access server a data pump is due to the access server's ability to modulate and demodulate the T.30 and T.4/T.6 protocols in the same manner that a data pump in a fax machine performs modulation/demodulation.

In one embodiment of the present invention, as shown in FIG. 2, the fax relay server 50 implements the T.30 and T.4/T.6 protocols, i.e., it extracts the fax messages that are encoded in those protocols. In addition, the fax relay server 50 has storage capability unlike the access servers which lack any secondary storage. Consequently, the fax relay server 50 together with any of the access servers, which function as data pumps, constitute a fax machine in the IP network 46. In as much as the access servers are distributed throughout the network as is evident from FIG. 2 where three access servers are shown, the presence of the fax relay server has the effect of distributing the functionality of the fax machine throughout the IP network 46. Accordingly, an embodiment of the present invention as shown in FIG. 2 may be called network distributed fax device.

In light of the above, each of the access servers in the IP network 46 has a dual purpose. Each access server can act as a fax relay point so that it can receive and transmit fax messages in the form of packets. Alternatively, the access server along with the fax relay server 50 can act as a fax machine.

The fax message, when located within the fax relay server 50, is stored on a disk and from there can be transmitted to a number of destinations. For instance, the fax message can either remain in storage for later delivery, transmitted to a printer (not shown in FIG. 2) for printing thereof or transformed into a Tagged Image File Format (TIFF) file by the fax relay server 50 and sent to the mail server 74. The latter can subsequently direct the fax message to any specified email recipient connected to the IP network 46, such as the email recipient 78.

Figure 3:
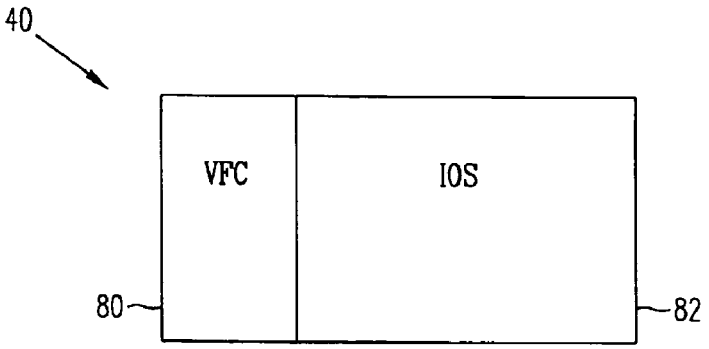
FIG. 3 shows the main components of any one of the access servers shown in FIG. 2.

FIG. 3 shows the main components of the access server 40 in more detail. In one embodiment of the present invention, the access servers shown in FIG. 2 are of the type AS5300, manufactured by Cisco Systems, Inc. of San Jose, Calif. But, in fact, any access server which supports fax relay could be employed. Cisco Systems manufactures a number of access servers, such as C2600, C03600, AS5300 and AS5800, which support fax relay.

Shown in FIG. 3 are the two components of the access server 40 which are designated as the voice feature card (VFC) 80 and the Internet Operating System ($IOS_{TM}$) 82. The VFC part 80 consists of a number of Digital Signal Processor (DSP) cards, each of which contains a number of DSP chips. When a fax message arrives at the access server 40, the DSP chips in the VFC 80 demodulate the message and subsequently packetize the message for transmission across the IP network 46. Information packets are sent from one point of the IP network 46 to another point using any fax relay protocol such as the T.38 protocol. The T.38 protocol is the international standard for fax relay protocol.

The actual reception and transmission or routing of the packets is performed by the IOS 82 in FIG. 3 which includes a operating system software that is proprietary to Cisco Systems although other types of operating systems may be readily employed. When the access server 62 receives fax messages, in the form of packets, the VFC 80 unbundles the packets and remodulates them for transmission to the receiving fax machine 70 through the intermediate PSTN 66. Hence, the VFC 80 is responsible for both modulating and demodulating fax messages in much the same way as the data pump 24 in FIG. 1 operates in an actual fax machine. For this reason, access servers in the IP network 46 are also called data pumps.

Figure 4:
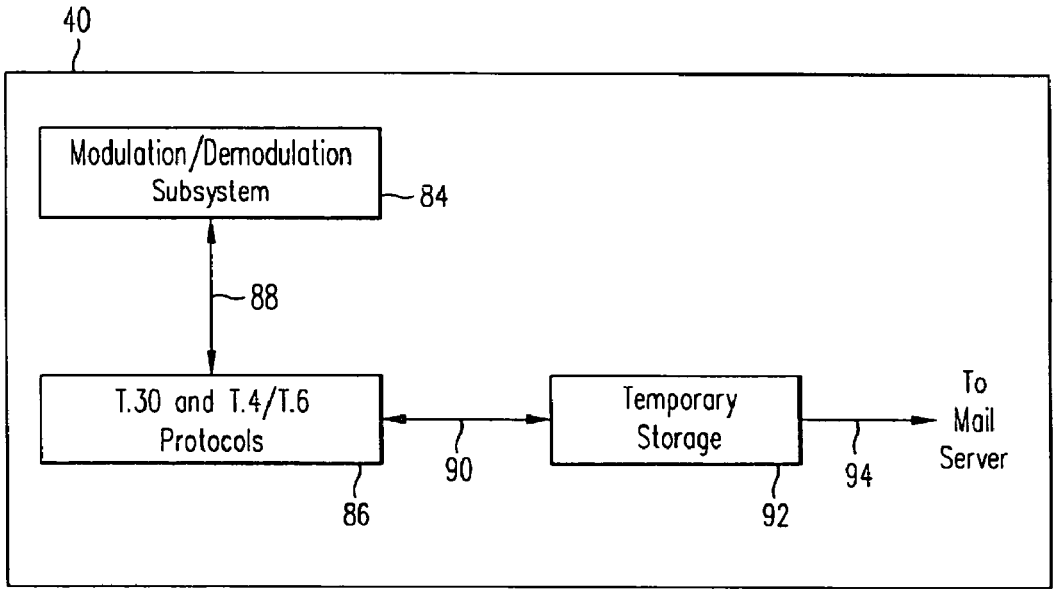
FIG. 4 shows the access server 40 including the a protocol subsystem 86 which implements the T.30 and T.4/T.6 protocols in accordance with an embodiment of the present invention.

The part of the fax relay server 50 which implements the T.30 and T.4/T.6 protocols can be placed anywhere in the IP network 46. For instance, it can be placed inside any network device such as the AS5300, an example of which is the access server 40 in FIG. 2. FIG. 4 shows the access server 40 in which the modulation/demodulation subsystem 84 consists of VFC 80 and IOS 82 and performs modulation and demodulation of the packets containing fax messages. In addition to the modulation/demodulation subsystem 84, the access server 40 is now shown to include a protocol subsystem 86, which implements the T.30 and T.4/T.6 protocols, i.e., extracts the fax message encoded in such protocols. A temporary storage 92 is also shown to be located within the access server 40. The modulation/demodulation subsystem 84 is coupled to the protocol subsystem 86 through the communication line 88. The protocol subsystem is coupled to the temporary storage 92 through a communication line 90. The temporary storage 92 is coupled to a mail server (not shown in FIG. 4) through the transmission line 94.

There are two main disadvantages in placing the protocol subsystem 86 which implements the T.30 and T.4/T.6 protocols within the access server 40. The first disadvantage arises from the subsystem 84 acting as a data pump, i.e. performing modulation/demodulation functions as explained in the previous paragraph. The modulation/demodulation subsystem 84 and the protocol subsystem 86 together constitute a fax machine, i.e., the access server 40 operates as a fax machine having modulation/demodulation and encoding/decoding capabilities of a fax machine. However, rather than using an access server in place of a fax machine, an actual fax machine could have been introduced into the IP network 46.

The second disadvantage associated with placing the protocol subsystem 86, which implements the T.30 and T.4/T.6 protocols within the access server 40 is due to the lack of secondary storage capability within the access server 40. An example of a secondary storage facility is a hard disk. As the number of arriving packets which carry fax messages increases, storage capacity in the temporary storage 92 becomes more limited until the storage facility has exceeded its capacity. As a result, lack of storage capacity presents a major hindrance to the growth of fax communication within an IP network when the protocol subsystem 86 is placed inside of the access server.

Figure 5:
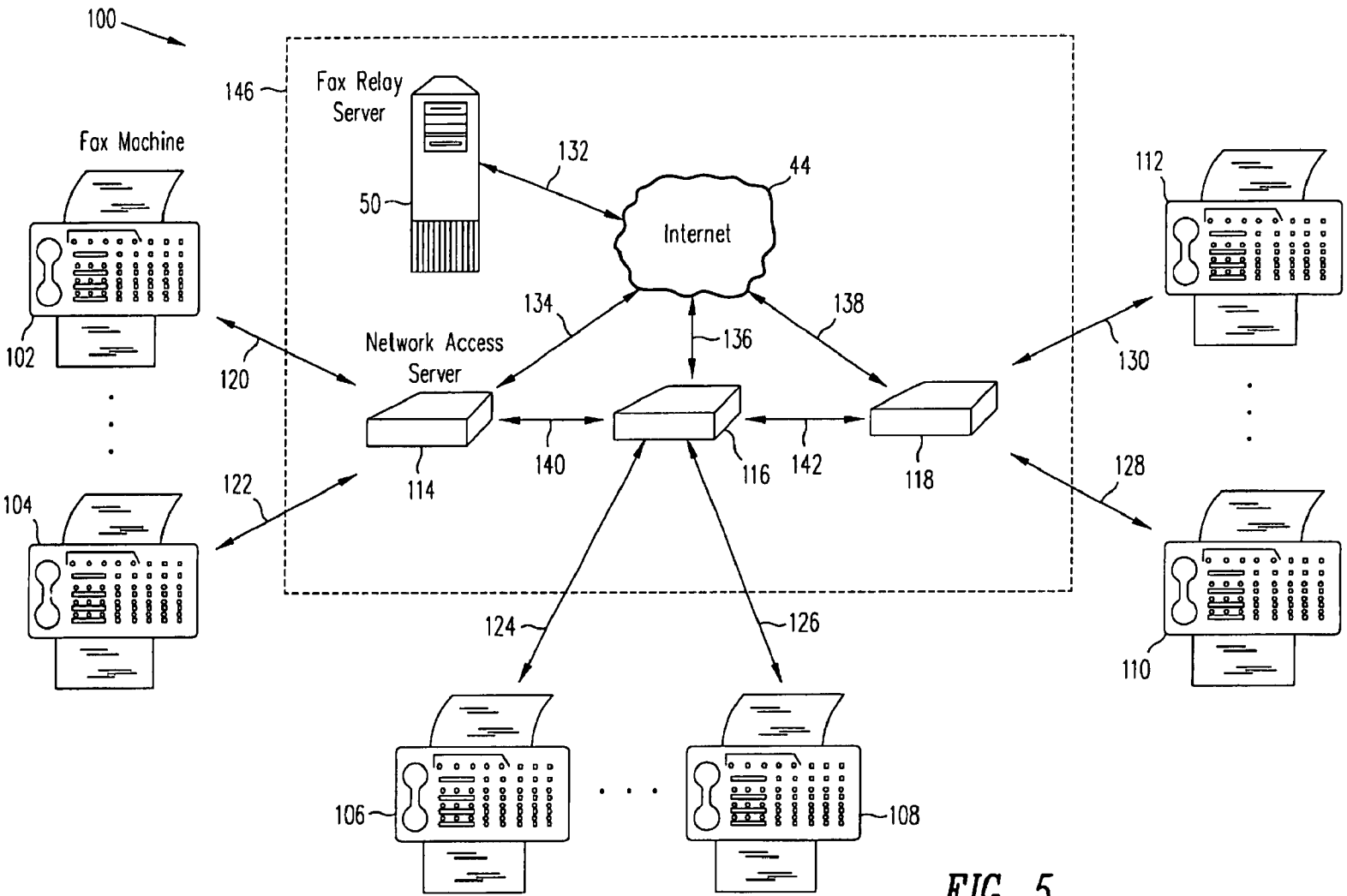
FIG. 5 shows a network distributed fax device 100 in accordance with an embodiment of the present invention.

It is therefore preferable to maintain the software which implements the T.30 and T.4/T.6 protocols independent of any access servers by placing the software in a server such as the fax relay server 50 shown in FIG. 2. FIG. 5 shows such a communications network 100 in which the T.30 and T.4/T.6 protocols are implemented within the fax relay server 50, which is located inside of the IP network 146. Also shown in FIG. 5 are a number of fax machines 102-112 connected to the IP network 146. In addition to the mail server 50, the IP network 146 comprises three AS5300 access servers 114, 116 and 118 and the network 44. As stated earlier, an example of the network 44 is the Internet and yet another example is a WAN such as the Cisco WAN.

Fax machines 102–112 are coupled to the access servers 114, 116 and 118 through the communication lines 120–130. Fax messages transmitted through the communication lines 120–130 are in the form of T.30 and T.4/T.6 protocols. Access servers 114, 116 and 118 are coupled to the network 44 through the transmission lines 134, 136 and 138, respectively while the fax relay server 50 is coupled to the network 44 through the transmission line 132. The access server 114 is coupled to the access server 116 and the latter is coupled to the access server 118 through the transmission lines 140 and 142, respectively.

Fax messages in the form of packets are transmitted inside the IP network 146 using any fax relay protocol such as the T.38 protocol. The latter, being the international standard for fax relay protocol, allows the fax relay server 50 to communicate with any other type of access server in the IP network 146. The network 146 could be any one of the variety of IP networks, such as IP over Asynchronous Transfer Mode (ATM) network or IP over frame relay network. The IP network, for the implementation of the present invention need be fast enough to support fax relay. The minimum speed required for fax relay is about 19.2 kbits/sec, however, large distributed networks typically operate at much higher speeds such as 100 Mbits/sec.

In one embodiment of the present invention, as shown in FIG. 5, each of the access servers 114, 116 and 118 together with the fax relay server 50 comprise a fax machine so that the communications network 100 represents a network distributed fax device. Accordingly, when fax messages encoded using fax relay protocols, such as the T.38 protocol, reach the fax relay server 50 they are converted to a fax message and stored on a disk therein. The access servers 114, 116 and 118, however, are still capable of sending fax messages in the form of T.30 and T.4/T.6 protocols to any of the fax machines 102–112 outside of the IP network 146.

The fax messages stored on disks inside the fax relay server 50 can either be routed to any point in the IP network 146 or can be sent directly to a printer for printing. Alternatively, the fax relay server can transform the fax messages into TIFF files and send the latter as email messages to another mail server which can in turn distribute them to any email recipient connected to the IP network 146. Furthermore, the network distributed fax device 100 shown in FIG. 5 can be distributed over a large geographic area if, for example, one of the access servers 114–118 is located in one country and the fax relay server 50 is located in another country.

Figure 6:
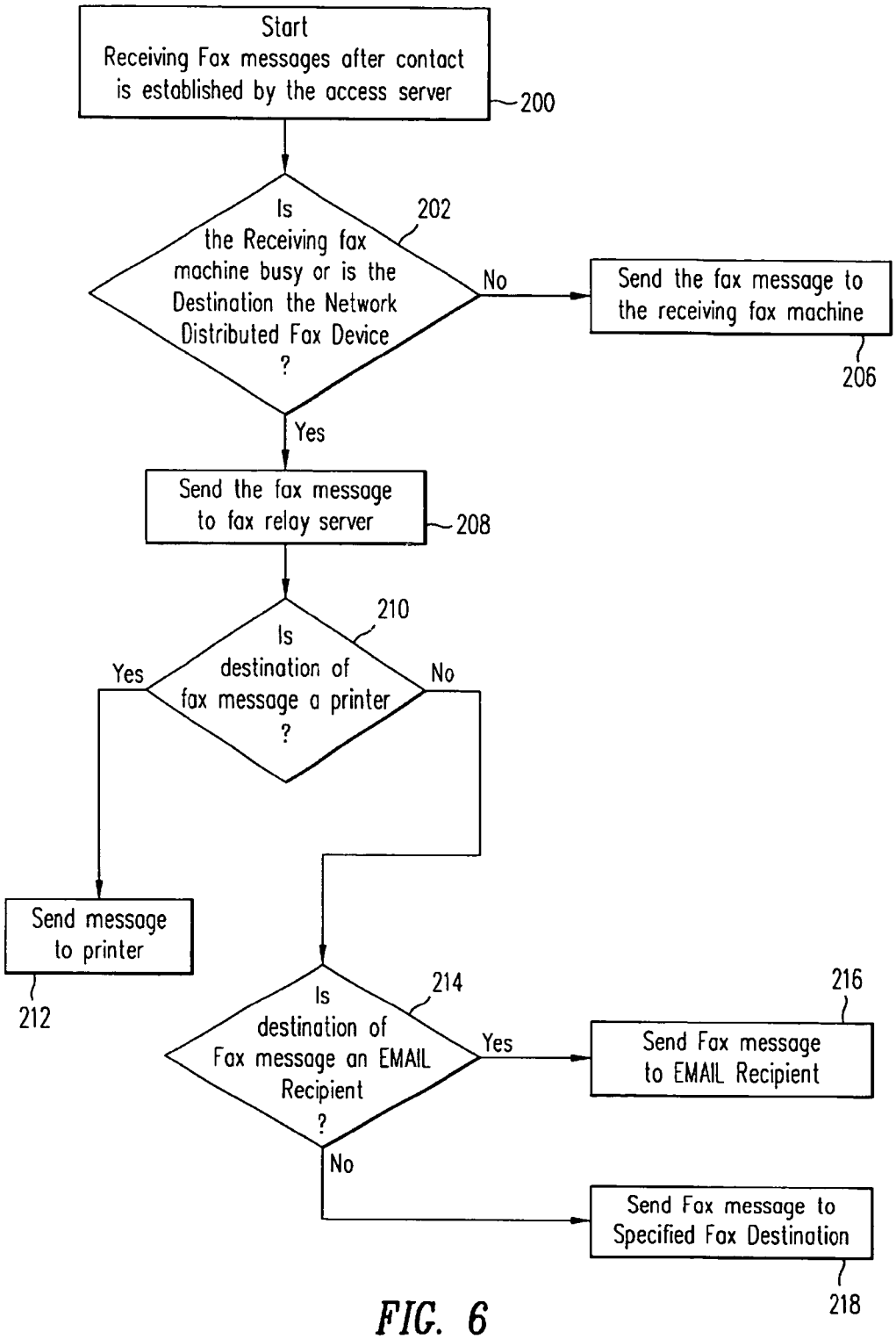
FIG. 6 shows, in flow chart form, the process performed by the network distributed fax device of FIG. 5.

FIG. 6 shows, in flow chart form, the process performed by the network distributed fax device of FIG. 5. At step 200, in FIG. 6, the access server contacts the destination, whether it is a receiving fax machine or other types of fax receiving devices. The access server does not necessarily know what type of device is receiving the fax message. Rather, an address of a destination (such as in the form of a telephone number) is provided to the access server. When the destination answers and negotiates a protocol with the access server, the access server starts to receive the fax message in small increments (packets). Upon receipt of the fax message, the access server demodulates the same using the VFC inside of the access server.

Next, at step 202, a determination is made as to whether or not the receiving fax machine is busy with other tasks or free to receive the fax message or whether or not the destination of the fax message is the network. If the destination of the fax message is the network, the fax transmission will end when the fax relay server receives the fax message. If the receiving fax machine is busy (when the access server tries to establish communications with the receiving fax machine, it receives a busy tone if the receiving fax machine is busy) or if the destination of the fax message is the network, the process proceeds to step 208.

If, however, at step 202, it is determined that the receiving fax machine is free, the fax message is transmitted by the access server to the receiving fax machine as indicated at step 206. The fax message, on its way to the receiving fax machine, may conceivably pass through another access server before arriving at the receiving fax machine's location.

At step 208, if the message is stored for the purposes of waiting for the availability of the receiving fax device, the fax message is stored within the fax relay server for subsequent transmission thereof to the receiving fax machine. At step 208, if the message's destination is the network, the fax transmission ends at step 208 with the fax message reaching the fax relay server.

It is also possible that the fax message is intended either to be received by an email recipient connected to the IP network 146 or simply by a printer connected to the same network or perhaps by another type of fax receiving device. In either of these cases, following step 202, the fax message is forwarded to the fax relay server 50 for storage therein as indicated in step 208. The fax relay server 50 can either send the fax message to a printer device, which is indicated by the determination at 210 where the fax relay server decides if the fax message is intended to be sent to a printer and then transmits the message at step 212 to the destination printer. Alternatively, the fax relay server determines if the fax message is to be sent to an email recipient, as indicated at 214 and then, at step 216, transforms the same into a TIFF file(s) for transmission to an email recipient depending upon the destination of the fax message as specified by the T.30 protocol. If the destination of the fax message is other than an email recipient, printer or a fax machine, the fax message is sent to the specified destination at step 218.

The network distributed fax device 100 is capable of scaling to a very large size. That is, the latter can grow in size without requiring a substantial investment as more access servers, which act as data pumps, are distributed in the IP network 146. This advantage is made possible by the presence of a centralized fax relay server 50 which implements the T.30 and T.4/T.6 protocols in one embodiment of the present invention as shown in FIG. 5.

Moreover, the fax relay server 50 of the network distributed fax device 100 makes the IP network more robust. That is, by keeping the implementation of the T.30 and T.4/T.6 protocols inside of the fax relay server 50 and out of the access servers 114–118, the latter access servers are allowed to efficiently perform their main function which is routing of the packets at a very fast rate thereby preserving the reliability of the IP network 146. Otherwise, each access server would be required to participate in implementation of the T.30 and T.4/T.6 protocols which could consume some of the time of the CPU within the access server thereby resulting in the latter being less reliable. The access server comprises the core of the IP network and as such has to be highly reliable in order to operate at very fast speeds. For example, a typical rate of switching packets for the AS5300 access server is 125,000 packets/sec. The present invention preserves the reliability of the access server by dedicating the implementation of the T.30 and T.4/T.6 protocols to the fax relay server 50.

Yet another advantage of using the network distributed fax device 100 lies in its capability to store fax messages and to deliver them at a later time. More specifically, consider the case where the fax machine 102 is sending a fax message to the fax machine 104. If the latter fax machine is busy with other tasks, the fax message is still sent through the access server 114 and the network 44 to the fax relay server 50 where it is stored on a disk. The fax message is then sent to its destination, i.e. fax machine 104, at a later time when the latter is no longer busy. Consequently, the originating fax machine 102 would no longer be occupied with trying to transmit the original fax message and can attend to other tasks.

It should be mentioned that there are currently fax products available in the market with modems being on the network. However, the protocol used for communication in such products is not the fax relay protocol and consequently these prior art fax products are not able to achieve the level of scaling, reliability and interoperability that is enjoyed when using the fax relay protocol as is the case in the present invention. Limitations in scaling in the aforementioned products is mainly due to the fact that more hardware, such as modems, is required in order to reach more destination points in the network. Placing more hardware on the network, however, increases the cost of sending fax transmissions thereby increasing costs associated with the expansion of such network-based fax products. Further problems with such prior art systems include having to place a PC (or processor) fairly close to the modem within the network because the protocol used to communicate information between the two is not well-suited for applications where these two devices are placed far away from one another.

Figure 7:
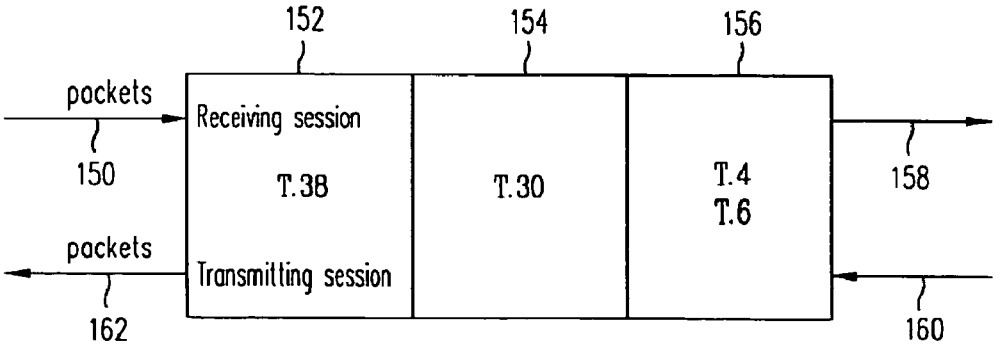
FIG. 7 shows a diagram to aid in the description of the implementation of the T.30 and T.4/T.6 protocols inside the fax relay server 50 of FIG. 5.

FIG. 7 shows the process of implementing the T.30 and T.4/T.6 protocols which takes place inside the fax relay server 50. The latter can either be receiving or transmitting packets of information which could be in the form of any fax relay protocol such as the T.38 protocol. The incoming packets 150 are received at step 152 in FIG. 7 where they are indicated to be in the form of the T.38 protocol although any other fax relay protocol would be acceptable. The T.38 protocol is then converted to the T.30 protocol at step 154. At certain points in the T.30 protocol, it is indicated that the actual fax message is encoded in the form of T.4/T.6 protocols. Subsequently, at step 156 the contents of the fax message are recovered by decoding the T.4/T.6 protocols. The actual fax message 158 can either be stored on a hard disk inside the fax relay server 50 or be sent out to a printer or be transformed to a TIFF file by the fax relay server 50 and sent out as email to a mail server.

The fax relay server extracts T.30/T.4/T.6 data from the IP packets in which they are transported in the IP network. These IP packets and protocol associated therewith are called fax relay. One standardized implementation of a fax relay protocol is called T.38. Once T.30/T.4/T.6 information is extracted from fax relay packets, the fax server runs T.30/T.4/T.6 protocols to communicate to the fax message recipient, which may be another fax server of IP distributed fax device or traditional fax machine in PSTN or a printer or an email recipient.

In the transmitting session, the steps mentioned above follow one another in exactly the reverse sequence. Namely, fax data 160 arrives at the fax relay server 50 where it is encoded in the form of T.4/T.6 protocols at step 156. At step 154 the T.4/T.6 protocols are complemented with the T.30 protocol which carries additional information such as the type of compression used on the fax data. Finally, the T.30 and T.4/T.6 protocols are converted to either T.38 protocol or any other fax relay protocol and sent out as packets 162 to other parts of the IP network 146.

What we claim is:

[1. A fax communication system for communicating fax information between at least two fax devices, through a packet switching network and from one point of the network to another point using any fax relay protocol adopted as a standard by the industry, each fax device including a data pump for modulating and demodulating fax information and a protocol subsystem for encoding and decoding the modulated fax information comprising:

multiple access servers including a sending access server, coupled to a sending fax device, for receiving modulated fax information therefrom, in packet form, for transmission thereof through the packet switching network to a receiving fax device, said sending access server including a data pump for demodulating the received modulated fax information prior to transmission thereof; and only one fax relay server, coupled to said multiple access servers, for receiving the demodulated fax information and decoding the same, said multiple access servers further including a receiving access server, coupled to the receiving fax device, for receiving the decoded fax information and re-modulating the same prior to transmission thereof to the receiving fax device, said fax relay sewer responsive to packets of fax information in accordance with the T.38 protocol and further operative to convert the T.38 packets of fax information to T.30 packets of information, the T.30 packets of information including T.4/T.6 information and the fax relay further operative to decode the T.4/T.6 information, wherein the functions of a fax device transmitting fax information through a packet switching network environment is distributed to multiple access servers and only one fax relay server within the network.]

[2. A fax communication system for communicating fax information, transmitted from a sending fax device to a fax recipient, through a packet switching network, from one point of the network to another point using any fax relay protocol adopted as a standard by the industry, the sending fax device including a data pump for modulating and demodulating fax information and a protocol subsystem for encoding and decoding the modulated fax information, the fax sending fax device for modulating the fax information prior to transmission thereof comprising:

multiple access servers including a particular access server, coupled between the sending fax device and the fax recipient, and being located within the packet switching network, the particular access server for receiving modulated fax information from the sending fax device and for demodulating the received fax information; and only one fax relay server, coupled to the multiple access servers, and responsive to the demodulated fax information and operative to decode the received demodulated fax information for transmission thereof to the fax recipient, said fax relay server further for storing the received demodulated fax information for later delivery of the same the fax relay server responsive to packets of fax information in accordance with the T.38 protocol and further operative to convert the T.38 packets of fax information to T.30 packets of information, the T.30 packets of information including encoded T.4/T.6 information and the fax relay server further operative to decode the T.4/T.6 information, wherein the multiple access servers and the only one fax relay server function as a network distributed fax device allowing for expansion of fax functionality throughout the network while preserving the reliability and robustness of the network.]

[3. A fax communication system as recited in claim 2 wherein the multiple access servers includes a voice feature card for demodulating the received fax information.]

[4. A method for operating a fax relay server for use in a packet switching network, from one point of the network to another point using any fax relay protocol adopted as a standard by the industry, for communicating fax information between two or more devices comprising:

receiving fax information encoded according to a T.30 fax encoding protocol from an access server included among multiple access servers;

decoding the received fax information, which is received in packets of fax information in accordance with the T.38 protocol;

converting the T.38 packets of fax information to T.30 packets of information, the T.30 packets of information including T.4/T.6 information;

decoding the T.4/T.6 information;

determining the destination of the decoded fax information pursuant to the content of the decoded fax information; and transmitting the decoded fax information to the determined destination.]

[5. A method of operating a fax relay server as recited in claim 4 wherein after the determining step, if the destination of the decoded fax information is determined to be a receiving fax device and the receiving fax device is busy, storing the decoded fax information for subsequent transmission.]

[6. A fax communication system for communicating fax information transmitted from a sending fax device to a fax recipient, through a packet switching network, from one point of the network to another point using any fax relay protocol adopted as a standard by the industry, the sending fax device including a data pump for modulating and demodulating fax information and a protocol subsystem for encoding and decoding the modulated fax information, the fax sending fax device for modulating the fax information prior to transmission thereof comprising:

multiple access servers including a particular access server coupled between the sending fax device and the fax recipient and being located within the packet switching network, the particular access server for receiving modulated fax information from the sending fax device and for demodulating the received fax information for transmission to a fax relay server for decoding of the received fax information, the particular access server including a voice feature card for demodulating the received fax information; and only one fax relay server, coupled to said multiple access servers, within the packet switching network, for storing the fax information and for decoding the demodulated fax information, said fax relay server responsive to packets of fax information in accordance with the T.38 protocol and further operative to convert the T.38 packets of fax information to T.30 packets of information, the T.30 packets of information including T.4/T.6 information and the fax relay further operative to decode the T.4/T.6 information, wherein the functions of a fax device are distributed within the network thereby allowing for expansion of fax functionality throughout the network while preserving the reliability and robustness of the network.]

*7. A method comprising:*

*receiving, with a fax relay server, one or more data packets including fax information from an access server over a packet-switched network, wherein the fax information includes fax transmission control data encoded according to a T.30 fax encoding protocol and includes fax content encoded according to a T.4 or T.6 fax encoding protocol;*

*extracting the fax information from the one or more data packets with the fax relay server;*

*decoding, with the fax relay server, the fax transmission control data according to the T.30 fax encoding protocol and decoding, with the fax relay server, the fax content according to the T.4 or T.6 fax encoding protocol; and*

*transmitting, with the fax relay server, the decoded fax content towards a destination device identified based on the decoded fax transmission control data.*

*8. The method of claim 7, further comprising when the destination device is determined to be a receiving fax device that is busy, storing the decoded fax content and the decoded fax transmission control data for subsequent transmission towards the receiving fax device when the receiving fax device is available to receive fax transmissions.*

*9. The method of claim 8, further comprising when the destination device is determined to be a printer, forwarding the decoded fax content from the fax relay server to the printer.*

*10. The method of claim 7, further comprising when the destination device is determined to be an email recipient device, converting the decoded fax content into a data file, and forwarding the data file from the fax relay server to the email recipient device in an email message.*

*11. A system comprising:*

*a fax relay server;*

*a first access server that is communicatively coupled to the fax relay server and a network, the first access server configured to receive a fax message that is modulated according to a T.30 and a T.4/T.6 protocol, configured to demodulate the fax message, configured to convert the demodulated fax message into a packetized fax message according to a fax relay protocol, and configured to transmit the packetized fax message;*

*a second access server that is communicatively coupled to the fax relay server and the network, the second access server configured to receive the packetized fax message, configured to convert the packetized fax message into the fax message, configured to remodulate the fax message according to the T.30 and the T.4/T.6 protocol, and configured to transmit the modulated fax message; and*

*a protocol subsystem to extract the T.30 and T.4/T.6 fax information from the packetized fax message.*

*12. The system of claim 11, wherein the first access server includes the protocol subsystem.*

*13. The system of claim 12, wherein the first access server further comprises a temporary storage medium coupled to the protocol subsystem, the temporary storage medium configured to store the T.30 and T.4/T.6 fax information.*

*14. The system of claim 11, wherein the fax relay server includes the protocol subsystem.*

*15. The system of claim 14, wherein the fax relay server further comprises a storage medium configured store the T.30 and T.4/T.6 fax information.*

*16. The system of claim 11, wherein the network includes an Internet.*

*17. The system of claim 11, wherein the network includes a wide area network (WAN).*

*18. The system of claim 11, wherein the fax relay protocol comprises a T.38 protocol.*

*19. The system of claim 11, wherein the fax relay server is configured to communicate with a mail server.*

*20. The system of claim 11, wherein the network includes an Asynchronous Transfer Mode (ATM) network.*

*21. The system of claim 11, wherein the network includes a frame relay network.*

*22. A method comprising:*

*receiving, with an access server, a modulated fax message over a circuit-switched network from a first fax machine, wherein the fax message includes fax transmission control data encoded according to a T.30 fax encoding protocol and includes fax content encoded according to a T.4 or T.6 fax encoding protocol;*

*demodulating, with the access server, the fax message and generating at least one data packet that includes the demodulated fax message, wherein the at least one data packet is generated according to a fax relay protocol that allows the at least one data packet to traverse over a packet-switched network;*

*determining, with the access server, whether a second fax machine is a destination of the fax message and is available to receive the fax message;*

*when the second fax machine is unavailable to receive the fax message or when the fax relay server is associated with the destination of the fax message, transmitting, with the access server, the at least one data packet to a fax relay server over the packet-switched network, wherein the fax relay server is configured to decode the fax transmission control data according to the T.30 fax encoding protocol and decode the fax content according to the T.4 or T.6 fax encoding protocol, and wherein the fax relay server is configured to transmit the decoded fax content towards a destination device identified based on the decoded fax transmission control data.*

*23. The method of claim 22, wherein when the destination device is determined to be the second fax machine, the fax relay server is configured to store the decoded fax content and the decoded fax transmission control data for subsequent transmission towards the second fax machine when the second fax machine is available to receive fax transmissions.*

*24. The method of claim 22, wherein when the destination device is determined to be a printer, the fax relay server is configured to forward the decoded fax content from the fax relay server to the printer.*

*25. The method of claim 22, further comprising when the destination device is determined to be an email recipient device, the fax relay server is configured to convert the decoded fax content into a data file, and forward the data file to the email recipient device in an email message.*

*26. A fax relay device comprising:*

*a network interface device to receive one or more data packets including fax information from an access server over a packet-switched network, wherein the fax information includes fax transmission control data encoded according to a T.30 fax encoding protocol and includes fax content encoded according to a T.4 or T.6 fax encoding protocol; and*

*a protocol subsystem to extract the fax information from the one or more data packets with the fax relay server, wherein the protocol subsystem is configured to decode the fax transmission control data according to the T.30 fax encoding protocol and decode the fax content according to the T.4 or T.6 fax encoding protocol, wherein the network interface device is configured to transmit the decoded fax content towards a destination device identified based on the decoded fax transmission control data.*

*27. The device of claim 26, further comprising a memory device to store the decoded fax content and the decoded fax transmission control data for subsequent transmission when the destination device is determined to be a fax machine, wherein the network interface device is configured to forward the decoded fax content and the decoded fax transmission control data towards the fax machine when the fax machine is available to receive fax transmissions.*

*28. The device of claim 26, wherein when the destination device is determined to be an email recipient device, the protocol subsystem is configured to convert the decoded fax content into a data file, and the network interface device is configured to forward the data file from the fax relay server to the email recipient device in an email message.*

* * * * *